United States Patent [19]

Franke

[11] 4,099,056

[45] Jul. 4, 1978

[54] X-RAY DIAGNOSTICS INSTALLATION COMPRISING AN X-RAY TUBE WITH A CONTROL GRID

[75] Inventor: Kurt Franke, Erlangen, Germany

[73] Assignee: Siemens Aktiengesellschaft, Berlin & Munich, Germany

[21] Appl. No.: 787,485

[22] Filed: Apr. 14, 1977

[30] Foreign Application Priority Data

Aug. 18, 1976 [DE] Fed. Rep. of Germany ....... 2637064

[51] Int. Cl.[2] .............................................. G03B 41/16

[52] U.S. Cl. .................................... 250/403; 250/413

[58] Field of Search ............... 250/401, 402, 403, 404, 250/405, 413

[56] References Cited

U.S. PATENT DOCUMENTS

| | | | |
|---|---|---|---|
| 3,567,940 | 3/1971 | Lambert | 250/405 |
| 3,683,191 | 8/1972 | MacLachlan | 250/405 |

*Primary Examiner*—Craig E. Church

*Attorney, Agent, or Firm*—Hill, Gross, Simpson, Van Santen, Steadman, Chiara & Simpson

[57] ABSTRACT

A circuit arrangement connected to the control grid of the x-ray tube comprises a resistance bridge having its input terminals connected to a voltage exceeding the grid cut-off voltage of the tube, the output terminals of the bridge being connected to the cathode and grid of the tube, and one arm of the bridge including a thyristor serving to control turn on of the x-ray tube by placing the bridge circuit in a substantially balanced condition, and a quenching circuit including a second thyristor in parallel with the first thyristor for interrupting conduction of the first thyristor to restore the bridge circuit to an unbalanced condition with the x-ray tube biased off.

1 Claim, 1 Drawing Figure

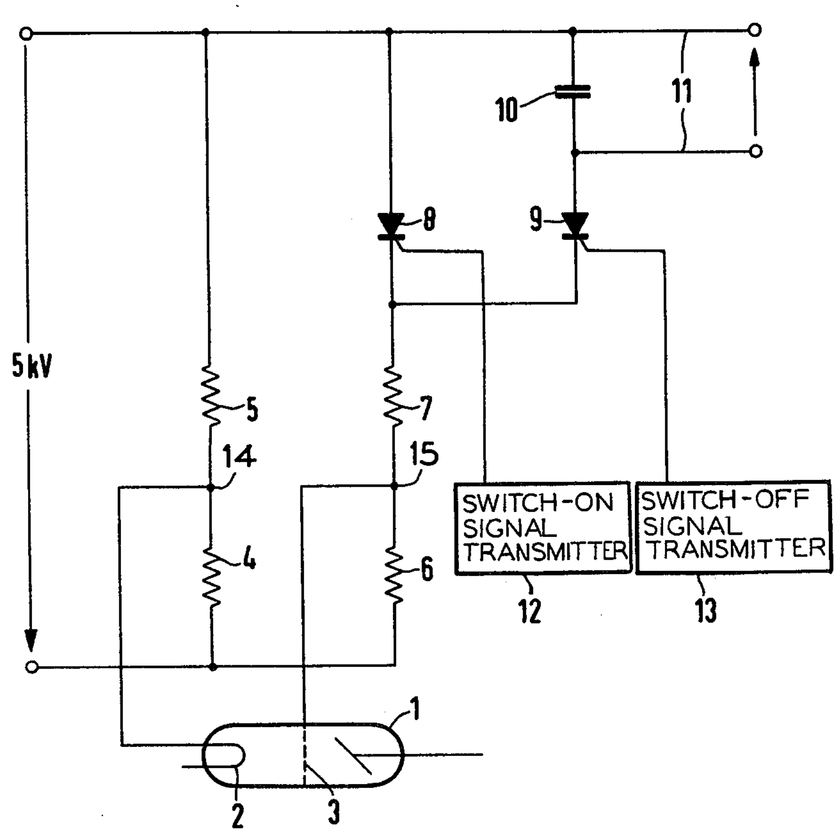
5kV
1
2
3
4
5
6
7
8
9
10
11
14
15
SWITCH-ON SIGNAL TRANSMITTER
12
SWITCH-OFF SIGNAL TRANSMITTER
13

X-RAY DIAGNOSTICS INSTALLATION COMPRISING AN X-RAY TUBE WITH A CONTROL GRID

BACKGROUND OF THE INVENTION

The invention relates to an x-ray diagnostics installation comprising an x-ray tube with a control grid as well as a circuit arrangement connected to said control grid for the purpose of switching the x-ray tube on and off.

An x-ray diagnostics installation such as this makes it possible to switch the x-ray tube on and off with very short switching times such as are required, for example, in x-ray motion picture technology.

SUMMARY OF THE INVENTION

The object which is the basis of the invention consists in disclosing a circuit arrangement for switching on and off the x-ray tube of an x-ray diagnostics installation of this type, having a simple construction; i.e., which is composed of only a few circuit elements, and which permits a reliable switching on and off at random time periods.

As specified by the invention, this object is achieved by virtue of the fact that the grid and the cathode of the x-ray tube are connected to the one diagonal of a resistance (or Wheatstone) bridge, to the other diagonal of which a high voltage is connected which is sufficient for blocking the x-ray tube, and that, disposed in one arm of the bridge there is the parallel-connection consisting of a switch-on current gate and the series-connection of a switch-off current gate with a quenching capacitor which is connected to a voltage source for the purpose of being charged to a voltage sufficient for quenching (or extinguishing) the switch-on current gate. The inventive circuit arrangement for switching the x-ray tube contains comparatively few, inexpensive components. Consequently, it is well suited for quantity production.

BRIEF DESCRIPTION OF THE DRAWING

The single FIGURE of drawings shows an illustrative embodiment of the invention by means of a schematic electric circuit diagram.

DETAILED DESCRIPTION

The drawing illustrates a grid-controlled x-ray tube 1. Between cathode 2 and control grid 3 of the x-ray tube 1, there is a circuit arrangement for switching the x-ray tube on and off, said circuit arrangement manifesting a bridge circuit in the one diagonal of which the grid-cathode election flow path of x-ray tube 1 is disposed, and to the other diagonal of which a high voltage of five kilovolts (5 kV) is connected which is sufficient for blocking x-ray tube 1. The bridge contains four resistances 4, 5, 6, 7. Arranged in series with resistance 7, there is the parallel-connection consisting of a switch-on-thyristor 8 and the series-connection made up of switch-off thyristor 9 and a quenching capacitor 10. Quenching capacitor 10 is connected via lines 11 to a non-illustrated voltage source for the purpose of being charged to a voltage which is sufficient for quenching (or extinguishing) switch on-thyristor 8.

Thyristor 8 is connected to a switch-on signal transmitter 12, and thyristor 9 is connected to a switch-off signal transmitter 13.

In the quiescent state, both thyristors 8 and 9 are in a non-conductive or quenched state, and the full voltage of 5 kV is connected between grid 3 and cathode 2 with a polarity so that x-ray tube 1 is blocked. If switch-on signal transmitter 12 supplies thyristor 8 with an ignition impulse, the resistance ratios of the bridge are changed, and zero-potential is connected to grid 3, relative to cathode 2, (the resistance bridge being substantially balanced with respect to its output terminals 14, 15 when thyristor 8 is shifted to its conducting state) so that x-ray tube 1 is switched on. In order to switch off x-ray tube 1, switch-off signal transmitter 13 supplies thyristor 9 with a switch-off impulse, so that thyristor 9 becomes conducting momentarily, and the voltage on capacitor 10 is connected in parallel with thyristor 8. As a consequence, thyristor 8 is quenched (or extinguished), and the 5 kV potential is again applied between the grid and cathode of x-ray tube 1; i.e., x-ray tube 1 is again switched off, and the exposure is terminated.

In operation, transmitter 12 initiates each x-ray exposure interval by supplying a momentary pulse to the control electrode of thyristor 8 switching the thyristor to the conducting state. At the end of each x-ray exposure interval, a momentary pulse is supplied to the control electrode of thyristor 9, rendering this thyristor momentarily conductive and thus applying the quenching potential of capacitor 10 to the anode of thyristor 8 to return thyristor 8 to its nonconducting state. The series circuit including capacitor 10, thyristor 9 and resistors 7 and 6 has a resistance such that current flow would be below the holding current level for thyristor 9; thus thyristor 9 returns to the nonconducting state at the end of each momentary pulse applied to the control electrode thereof.

It will be apparent that many modifications and variations may be effected without departing from the scope of the novel concepts and teachings of the present invention.

I claim as my invention:

1. X-ray diagnostics installation comprising an x-ray tube with a control grid, as well as comprising a circuit arrangement connected to said control grid for switching the x-ray tube on and off, characterized in the provision of a resistance bridge with input and output terminal means, and in that the grid and the cathode of the x-ray tube are connected to the output terminal means of the resistance bridge, and in that a high voltage is connected to the input terminal means of the resistance bridge which is sufficient for blocking the x-ray tube, and that, in one arm of the bridge, there is disposed the parallel-connection consisting of a switch-on current gate and the series-connection of a switch-off current gate with a quenching capacitor for connection to a voltage source for the purpose of being charged to a voltage sufficient for quenching the switch-on current gate.

* * * * *